United States Patent
Qiu et al.

(10) Patent No.: US 8,533,435 B2
(45) Date of Patent: Sep. 10, 2013

(54) REORDERING OPERANDS ASSIGNED TO EACH ONE OF READ REQUEST PORTS CONCURRENTLY ACCESSING MULTIBANK REGISTER FILE TO AVOID BANK CONFLICT

(75) Inventors: Xiaogang Qiu, San Jose, CA (US); Ming Y. Siu, Santa Clara, CA (US); Yan Yan Tang, San Jose, CA (US); John Erik Lindholm, Saratoga, CA (US); Michael C. Shebanow, Saratoga, CA (US); Stuart F. Oberman, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 558 days.

(21) Appl. No.: 12/875,843

(22) Filed: Sep. 3, 2010

(65) Prior Publication Data

US 2011/0072243 A1 Mar. 24, 2011

Related U.S. Application Data

(60) Provisional application No. 61/245,603, filed on Sep. 24, 2009.

(51) Int. Cl.
*G06F 9/34* (2006.01)

(52) U.S. Cl.
USPC ....... 712/214; 711/149; 712/216; 712/E9.027

(58) Field of Classification Search
None
See application file for complete search history.

(56) References Cited

U.S. PATENT DOCUMENTS

| | | | | |
|---|---|---|---|---|
| 4,980,817 A | * | 12/1990 | Fossum et al. | 712/4 |
| 5,644,780 A | * | 7/1997 | Luick | 712/23 |
| 7,469,404 B2 | * | 12/2008 | Zhang et al. | 717/156 |
| 2005/0125594 A1 | * | 6/2005 | Mattausch et al. | 711/5 |
| 2007/0239970 A1 | * | 10/2007 | Liao et al. | 712/225 |

* cited by examiner

*Primary Examiner* — Kenneth Kim
(74) *Attorney, Agent, or Firm* — Patterson & Sheridan, L.L.P.

(57) ABSTRACT

One embodiment of the present invention sets forth a technique for collecting operands specified by an instruction. As a sequence of instructions is received the operands specified by the instructions are assigned to ports, so that each one of the operands specified by a single instruction is assigned to a different port. Reading of the operands from a multi-bank register file is scheduled by selecting an operand from each one of the different ports to produce an operand read request and ensuring that two or more of the selected operands are not stored in the same bank of the multi-bank register file. The operands specified by the operand read request are read from the multi-bank register file in a single clock cycle. Each instruction is then executed as the operands specified by the instruction are read from the multi-bank register file and collected over one or more clock cycles.

19 Claims, 11 Drawing Sheets

REORDERING OPERANDS ASSIGNED TO EACH ONE OF READ REQUEST PORTS CONCURRENTLY ACCESSING MULTIBANK REGISTER FILE TO AVOID BANK CONFLICT

CROSS-REFERENCE TO RELATED APPLICATIONS

This application claims priority benefit to United States provisional patent application titled, "UNIFIED COLLECTOR STRUCTURE FOR MULTI-BANK REGISTER FILE," filed on Sep. 24, 2009 and having Ser. No. 61/245,603.

BACKGROUND OF THE INVENTION

1. Field of the Invention

Embodiments of the invention relate generally to a unified collector structure for multi-bank register file.

2. Description of the Related Art

Conventional processors collect the operands that are specified by each instruction so that the instruction can be executed. The operands may be stored in a multi-port storage in order to read all of the operands in a single clock cycle. As the maximum number of operands that may be specified by a single instruction increases, the number of ports available in the multi-port storage that are needed to read the operands also increases. Increasing the number of ports increases the size of the multi-port storage and also increases the amount of time needed to complete each read operation.

Accordingly, what is needed are improved methods and systems for collecting operands specified by instructions.

SUMMARY OF THE INVENTION

A system and method for collecting operands that are specified by an instruction from a multi-bank register file. As a sequence of instructions is received, the operands specified by the instructions are assigned to ports, so that each one of the operands specified by a single instruction is assigned to a different port. Reading of the operands from a multi-bank register file is scheduled by selecting an operand from each one of the different ports to produce an operand read request. The order in which the operands assigned to a port is modified, as needed to ensure that two or more of the selected operands are not stored in the same bank of the multi-bank register file. The operands specified by the operand read request are then read from the multi-bank register file in a single clock cycle. Each instruction is then executed as the operands specified by the instruction are read from the multi-bank register file and collected over one or more clock cycles.

Various embodiments of a method of the invention collect operands that are specified by instructions. The method includes storing a sequence of instructions that specify operands in a queue and assigning each operand specified by an instruction in the queue to a different read request port to produce a set of assigned operands for each one of the read request ports, where each read request ports is associated with a read port of a multi-bank register file. The assigned operands are reordered within each set of assigned operands to avoid bank conflicts between different banks of the multi-bank register file. The multi-bank register file is read to obtain one operand from each set of assigned operands in an access cycle.

Various embodiments of the invention include a system for collecting operands for instructions. The system includes a streaming multi-processor including a local register file. The local register file is configured to store a sequence of instructions in a queue and assign each operand specified by an instruction to a different read request port to produce a set of assigned operands for each one of the read request ports, where each read request ports is associated with a read port of a multi-bank register file. The assigned operands are reordered within each set of assigned operands to avoid bank conflicts between different banks of the multi-bank register file. The multi-bank register file is read to obtain one operand from each set of assigned operands in an access cycle.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
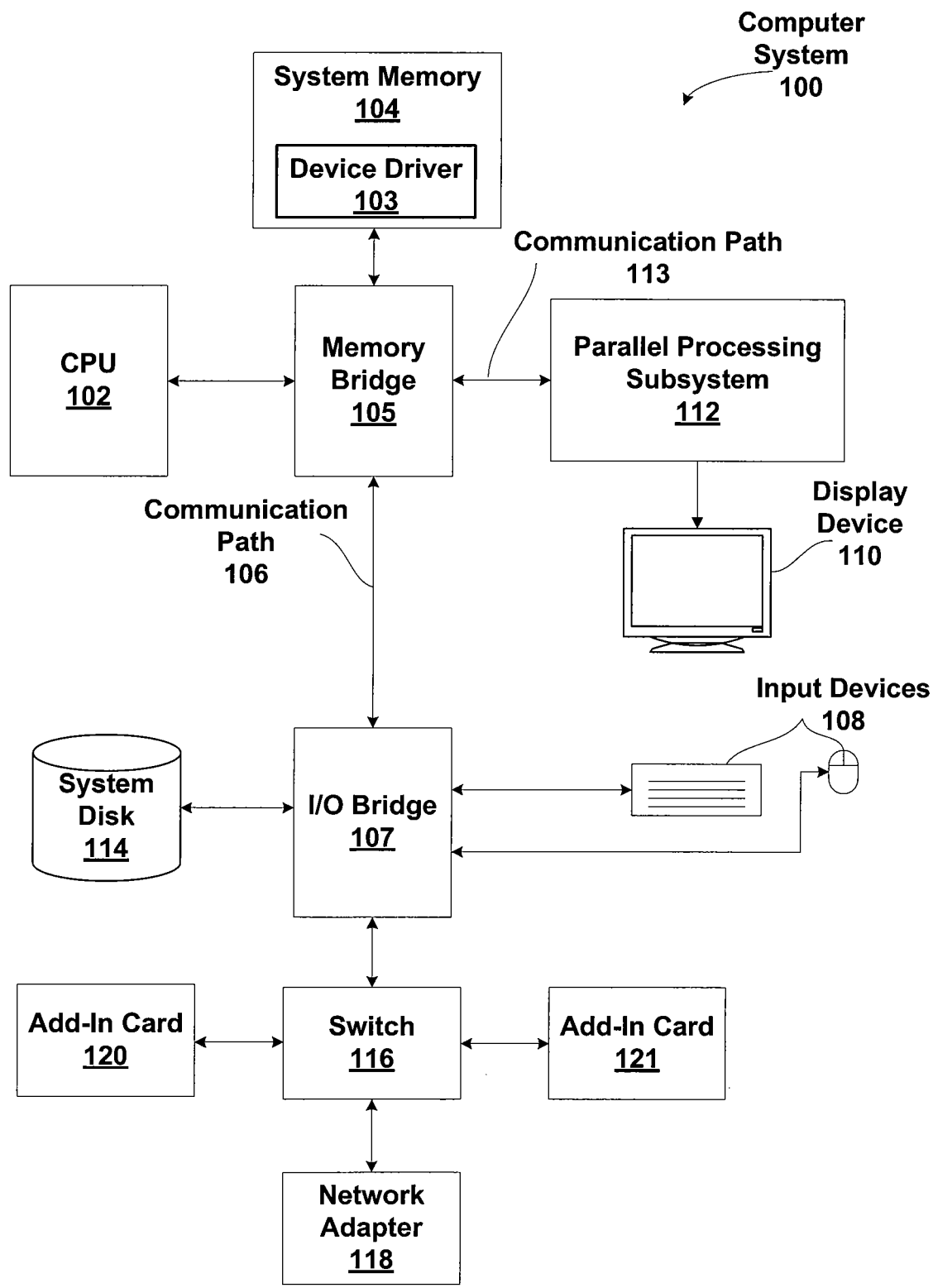
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
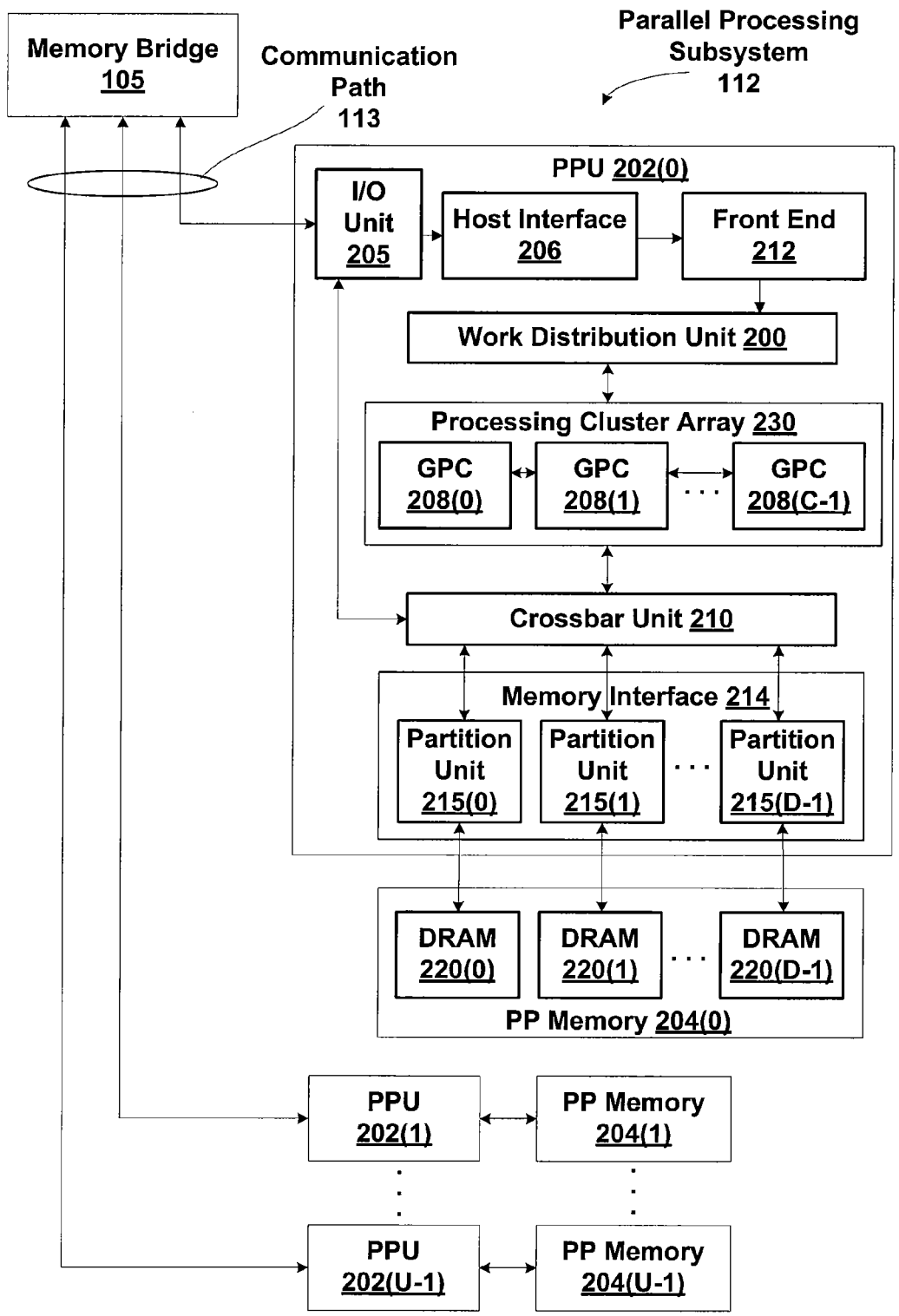
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≧1. Each portion of parallel processing memory 204 generally includes one or more memory devices (e.g. DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
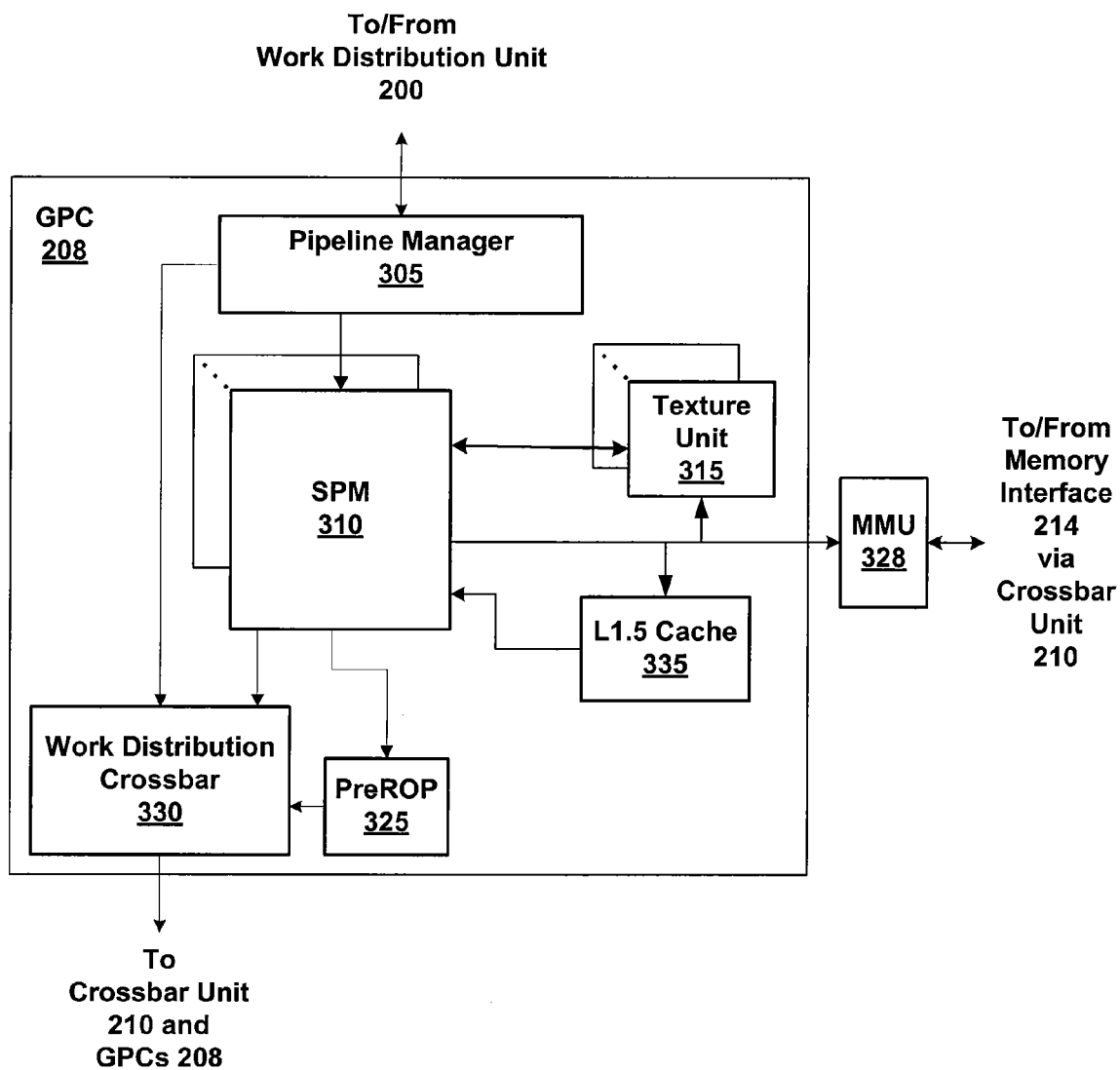
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CIA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

Figure 3B:
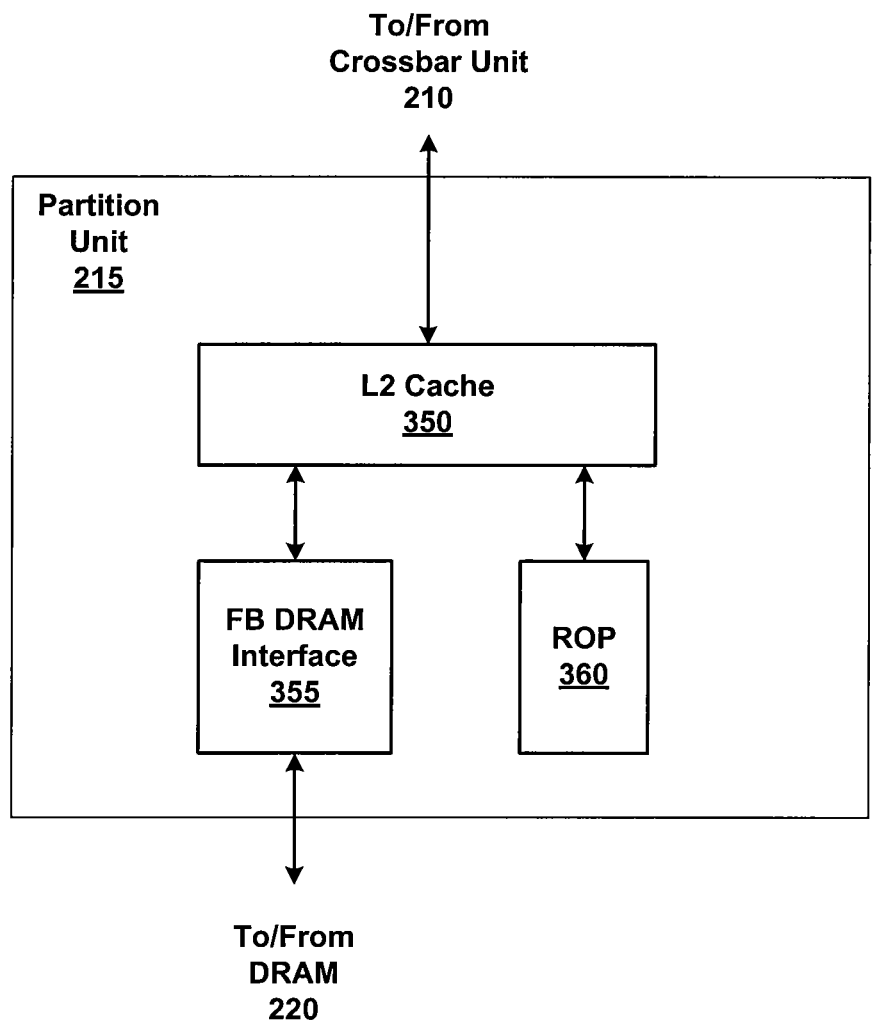
FIG. 3B is a block diagram of a partition unit within one of the PPUs of FIG. 2, according to one embodiment of the present invention.
Figure 3C:
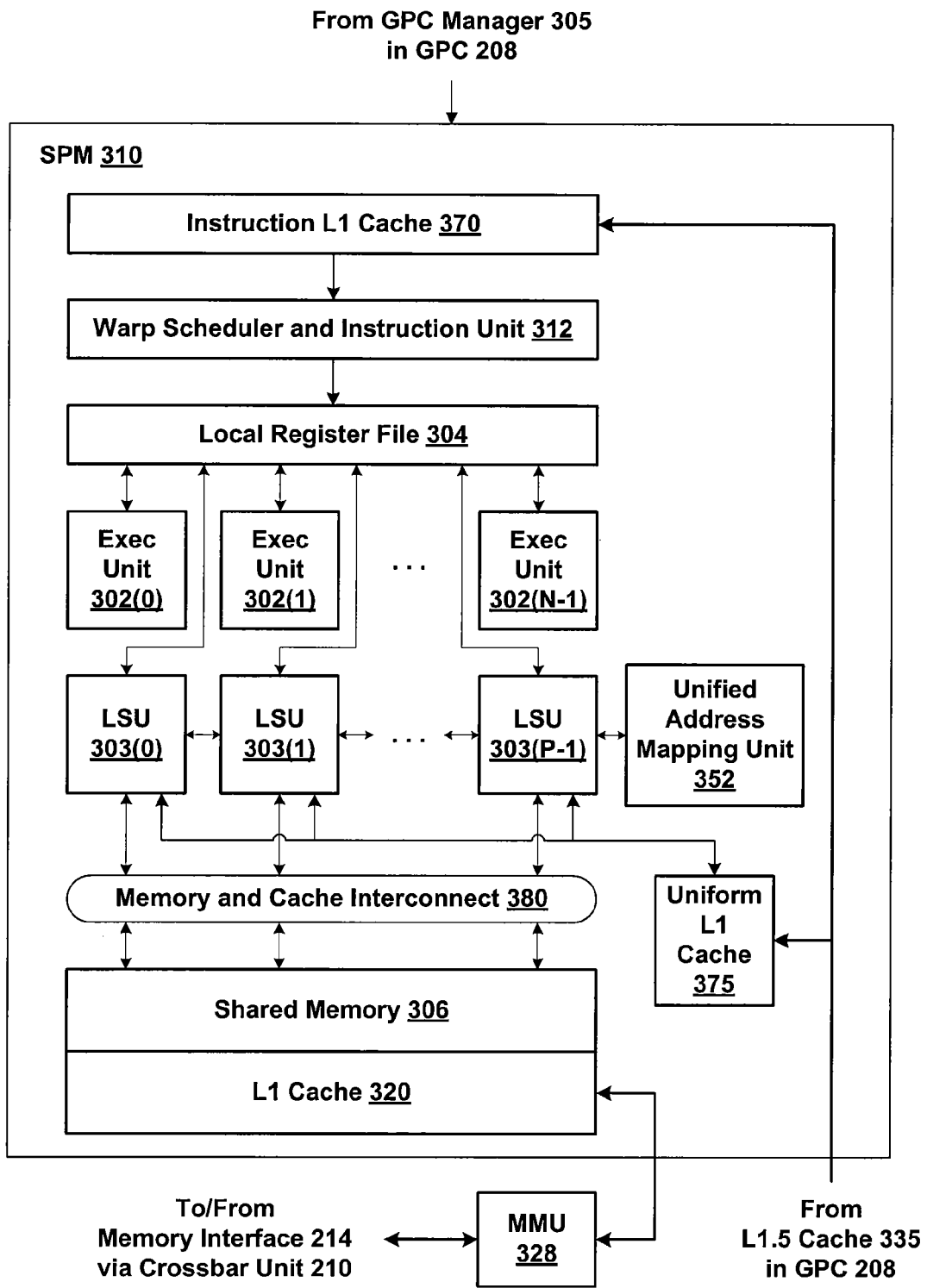
FIG. 3C is a block diagram of a portion of the SPM of FIG. 3A, according to one embodiment of the present invention.

Also, each SPM 310 advantageously includes an identical set of functional units (e.g., arithmetic logic units and load-store units shown as Exec units 302 and LSUs 303 in FIG. 3C) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The physical address is processed to distribute surface data access locality to allow efficient request interleaving among partition units. The cache line index may be used to determine whether of not a request for a cache line is a hit or miss.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Graphics Pipeline Architecture

Figure 4:
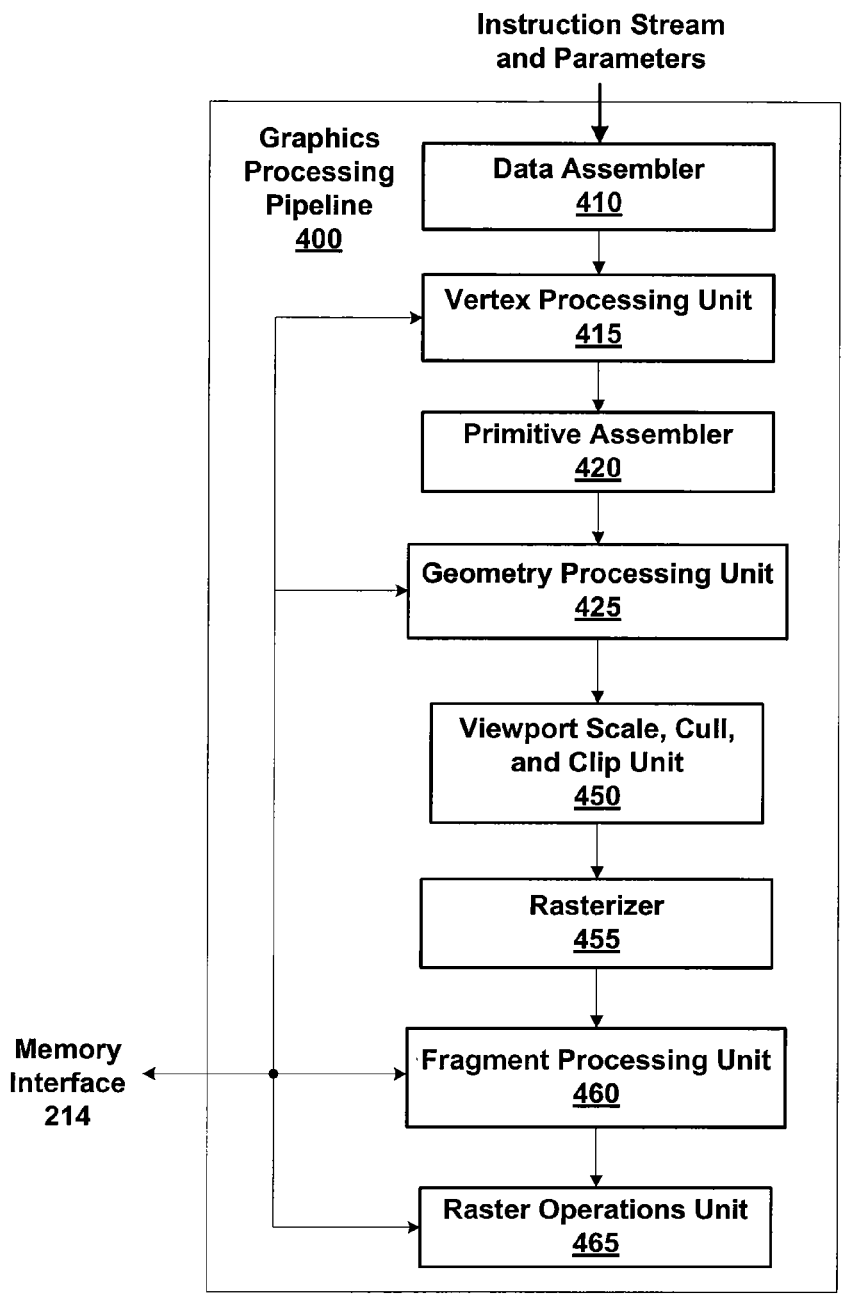
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Collecting Operands Specified by Instructions

For area efficiency reasons, SPMs 310 use one read one write random access memories (RAMs) to implement the local register file 304. Multiple banks of RAMs are used to achieve enough bandwidth needed for dispatching instructions. When all the operands are collected into the collector, the instruction can be dispatched to the execution units 302.

Figure 5A:
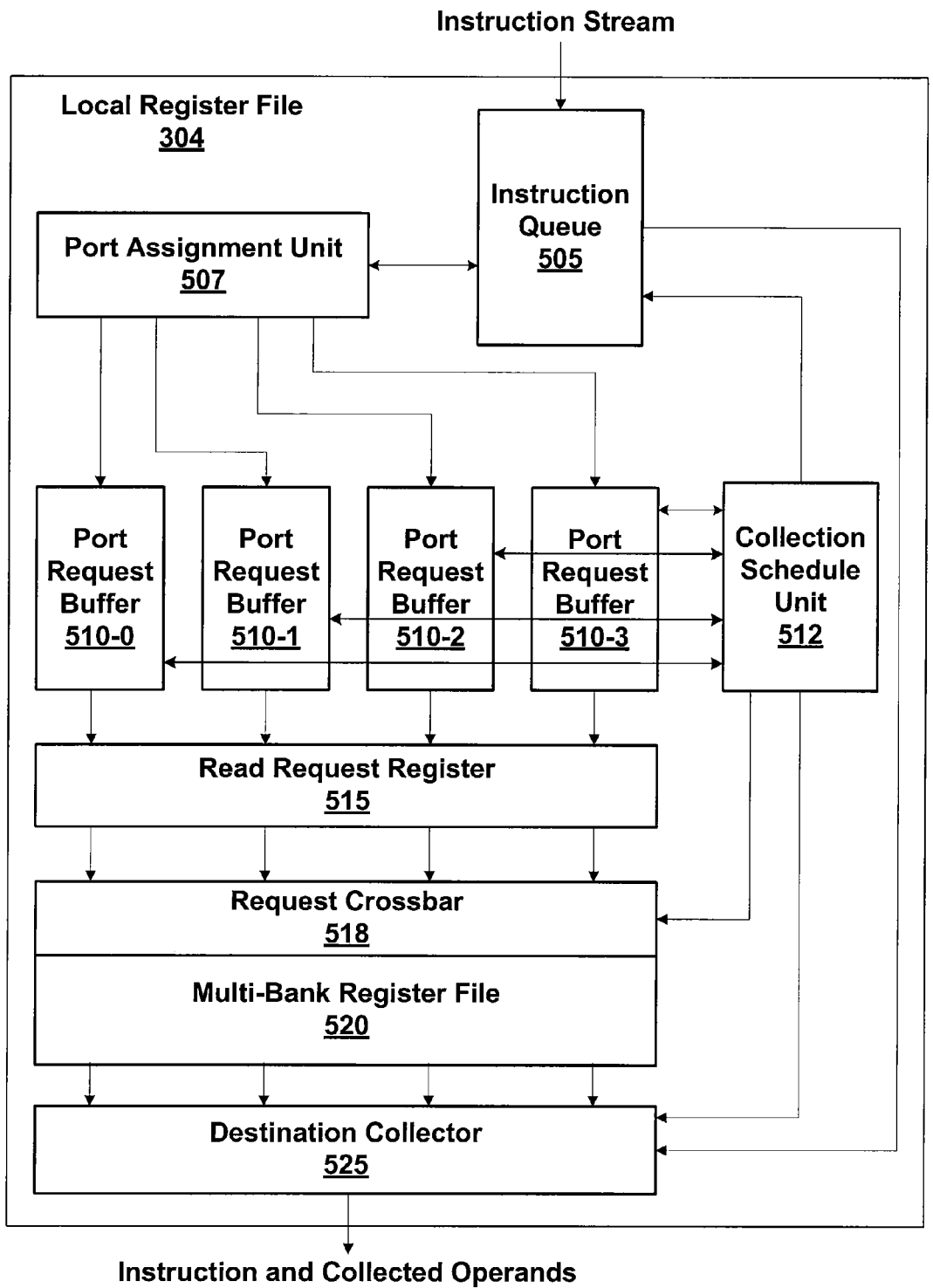
FIG. 5A is a block diagram of the local register file of FIG. 3C, according to one embodiment of the present invention.

FIG. 5A is a block diagram of the local register file 304 of FIG. 3C, according to one embodiment of the present invention. Collection of the operands specified by the instructions is performed using an instruction queue 505, a port assignment unit 507, port request buffers 510, a collection schedule unit 512, a read request register 515, a request crossbar 518, a multi-bank register file 520, and a destination collector 525. The instruction queue 505 receives a stream of instructions (or pointers to instructions) from the warp scheduler and instruction unit 312 and is organized as collapsing FIFO (first-in-first-out) to maintain the age of each instruction. The instructions are stored in order and removed from the queue when the instructions are dispatched to the execution units 302. When the buffer is full, the incoming instructions are not accepted. When an instruction enters the instruction queue 505, the instruction requests collectors for all operands specified by the instruction. In one embodiment, the instruction queue 505 can enqueue one input instruction and dequeue two instructions per clock cycle.

The port assignment unit 507 assigns read requests for the operands specified for an instruction to different ports so that all of the collected operands for the instruction will be output by the destination collector 515 to the execution units 302 in the same clock cycle. As shown in FIG. 5A, one embodiment may include four different port request buffers 510-0, 510-1, 510-2, and 510-3. Each port request buffer 510 may be a queue that stores five entries. In a clock cycle one read request may enter each one of the different port request buffers 510-0, 510-1, 510-2, and 510-3 from either the instruction queue 505 or, when the instruction queue 505 is empty, from the instruction stream. When multiple instructions are available in the instruction queue 505 that have not yet requested operands, priority is given to operand read requests of the oldest eligible instruction. If there are not enough entries available to store all read requests for operands from a single instruction, the instruction will not enter any of the port request buffers, until space becomes available to store all of the read requests for the instruction.

Each clock cycle, one entry can be dequeued from each one of the port request buffers 510 and output to the read (port front) request register 515. The read request register 515 stores the one read request from each one of the port request buffers 510 and outputs the read requests to the multi-bank register file 520 via the request crossbar 518. Each clock cycle, the collection schedule unit 512 selects the oldest operand stored in each one of the port request buffers 510 (or at the input of the queue when a port request buffer 510 is empty) for output to the read request register 515.

When a bank conflict (described further herein) is detected between two of the selected oldest operands, the next oldest operand is selected from the port request buffer 510 storing one of the conflicting operands. This process is repeated by the collection schedule unit 512 until the available operands in each port request buffer 510 are exhausted or a non-conflicting operand is selected from each one of the port request buffers 510. In one embodiment, the oldest operand is always selected from the port request buffer 510-0 and non-conflicting operands are selected from the port request buffer 510-1, 510-2, and 510-3, preferring the oldest operand in each one of the port request buffers 510. Since the port request buffers 510 are queues, the operands are ordered oldest to youngest in each one of the port request buffer 510.

The read request register 515 outputs read requests for the selected operands to the multi-bank register file 520 via the request crossbar 518. Embodiments of the invention implement 1R1W (one-read-one-write) pseudo-dual-port RAMs as register files because of the area efficiency. Assuming that the multi-bank register file 520 is constructed using two or more separate 1R1W (1-read 1-write) RAMs, each one of the RAMs is a bank, and a bank conflict exists when the read request register 515 includes two or more read requests for the same bank. In order to maximize the read throughput of the multi-bank register file 520, the read request register 515 should not include operand read requests for conflicting banks. The collection schedule unit 512 ensures that any bank conflicts are avoided when the operands are selected from each one of the port request buffers 510. However, the read requests for each bank output by the read request register 515 may not be aligned to the respective banks of the multi-bank register file 520. The request crossbar 518 is configured to route each read request to the corresponding bank of the multi-bank register file 520.

The operands that are read from the multi-bank register file 520 (collected operands) are output to the destination collector 525. The destination collector 525 holds the collected operands before each instruction (and collected operands that are specified by the instruction) is dispatched to the execution units 302. There are at least two reasons to use the destination collector 525 to temporally hold the collected operands. Firstly, because of bank conflict avoidance, the operands of an instruction may not be read from the multi-bank register file 520 in the same clock cycle. The destination collector 525 will hold the early collected operands and wait until all operands are collected to dispatch the instruction into execution units 302. Secondly, embodiments of the invention support dual-issue to the execution units 302, so two instructions may be dispatched in one clock cycle (and each of the units shown in FIG. 5A is duplicated). The two instructions that are dispatched into the execution units 302 may have conflicts for various resources, including needing to write back results into the same bank of the multi-bank register file 520. A dispatch rule is enforced to avoid resource conflicts. An instruction may have to wait for dispatch even if all of the operands specified by the instruction are collected. The destination collector 525 will hold the operands for the instruction waiting to dispatch.

The collection schedule unit 512 broadcasts read request status to each entry in the instruction queue 505 that provides information regarding which operands will be collected for each read request output by the read request register 515. An entry in the instruction queue 505, i.e., an instruction, becomes ready to dispatch when all of the operands specified by the instruction are collected. As soon as the instruction queue 505 entry is dispatched, the entries in the destination collector 525 that stored the collected operands are freed so that newly collected operands can be stored in the destination collector 525. The order in which the instructions are dispatched may be different than the order in which the instructions are received by the instruction queue 505. However, the port assignment unit 527 and collection schedule unit 512 are configured to give higher priority to older instructions and older operands. When more than one instruction is available for dispatch, dispatching may also be performed giving priority to the older instruction.

In one embodiment, the local register file 304 receives two instructions every clock cycle and there are two separate instruction queues 505. Similarly, the number of port assignment units 527, port request buffers 510, collection schedule unit 512, read request register 515, request crossbar 518, multi-bank register file 520, and destination collector 525 are also doubled. One instruction queue 505 stores instructions for odd warps and the other instruction queue 505 stores instructions for even warps.

Figure 5B:
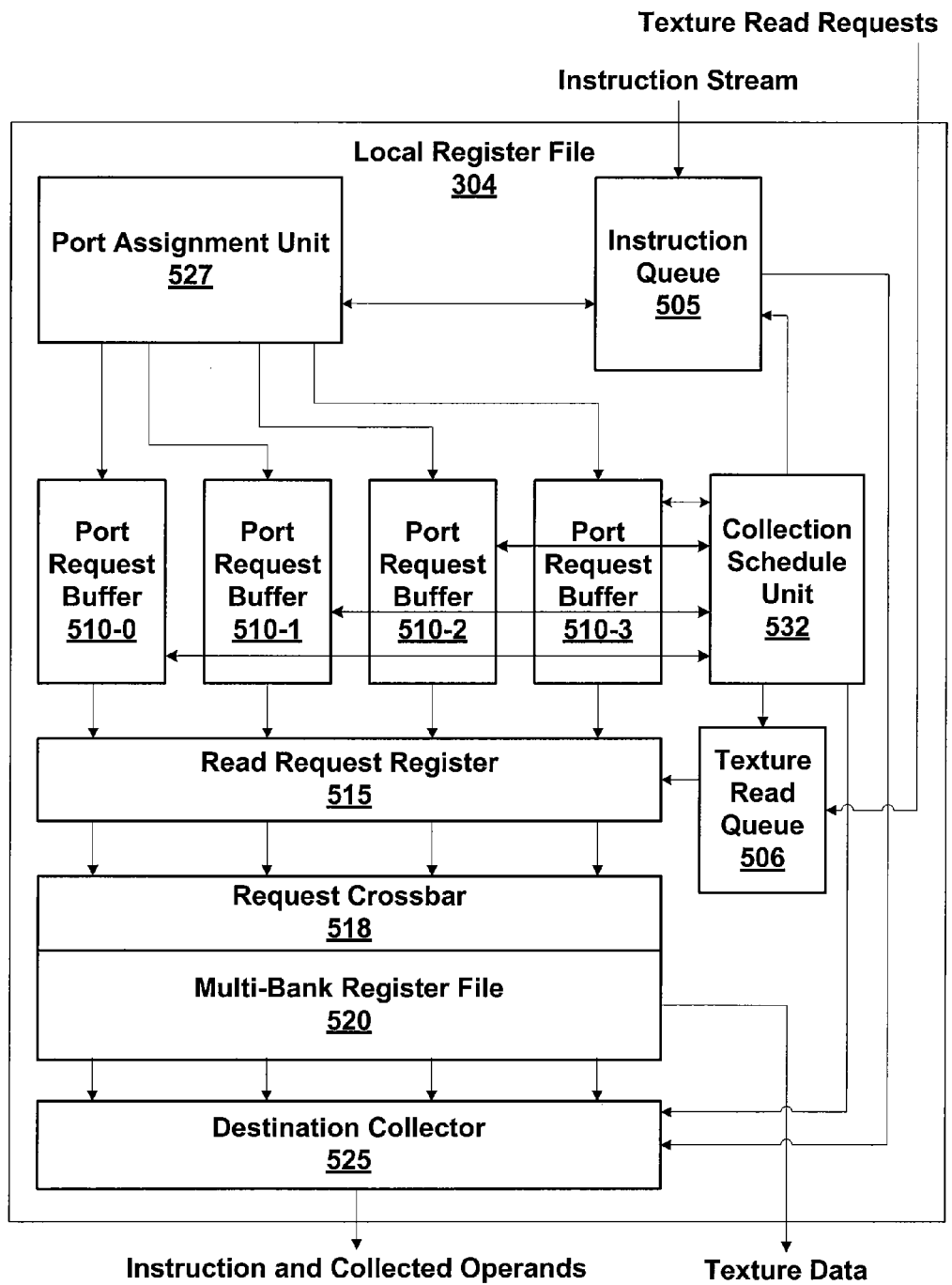
FIG. 5B is another block diagram of the local register file of FIG. 3C, according to one embodiment of the present invention.

FIG. 5B is another block diagram of the local register file 304 of FIG. 3C, according to one embodiment of the present invention. In this embodiment of the local register file 304, a collection schedule unit 532 performs the functions of previously described collection schedule unit 512. A texture read queue 506 receives read requests for texture data that is stored in the multi-bank register file 520. Each one of the texture read requests reads from one bank of the multi-bank register file 520. As each texture read request is received and stored in the texture read queue 506, the collection schedule unit 532 inserts the texture read request into the read request register 515, delaying reading of one of the operands as needed to read the texture data from the multi-bank register file 520. In one embodiment, texture write requests are also performed and may similarly delay reading of one of the operands.

The operand collection is advantageously decoupled from the instruction dispatch in order to maximize the access bandwidth provided by the multi-bank register file 520. Because the instructions may be dispatched for execution out-of-order compared with the order in which the instructions are received, there is greater flexibility in terms of timing the collection of the operands. Each port request buffers 510 is organized as a unified resource pool, which is shared by all the pending instructions, thereby allowing the collection schedule unit 512 to efficiently schedule collection of the operands, by selecting operands from the port request buffers 510 while avoiding bank conflicts and giving priority to older operands. Multiple operands are read in the same cycle to dispatch the instructions to execution units 302.

Figure 5C:
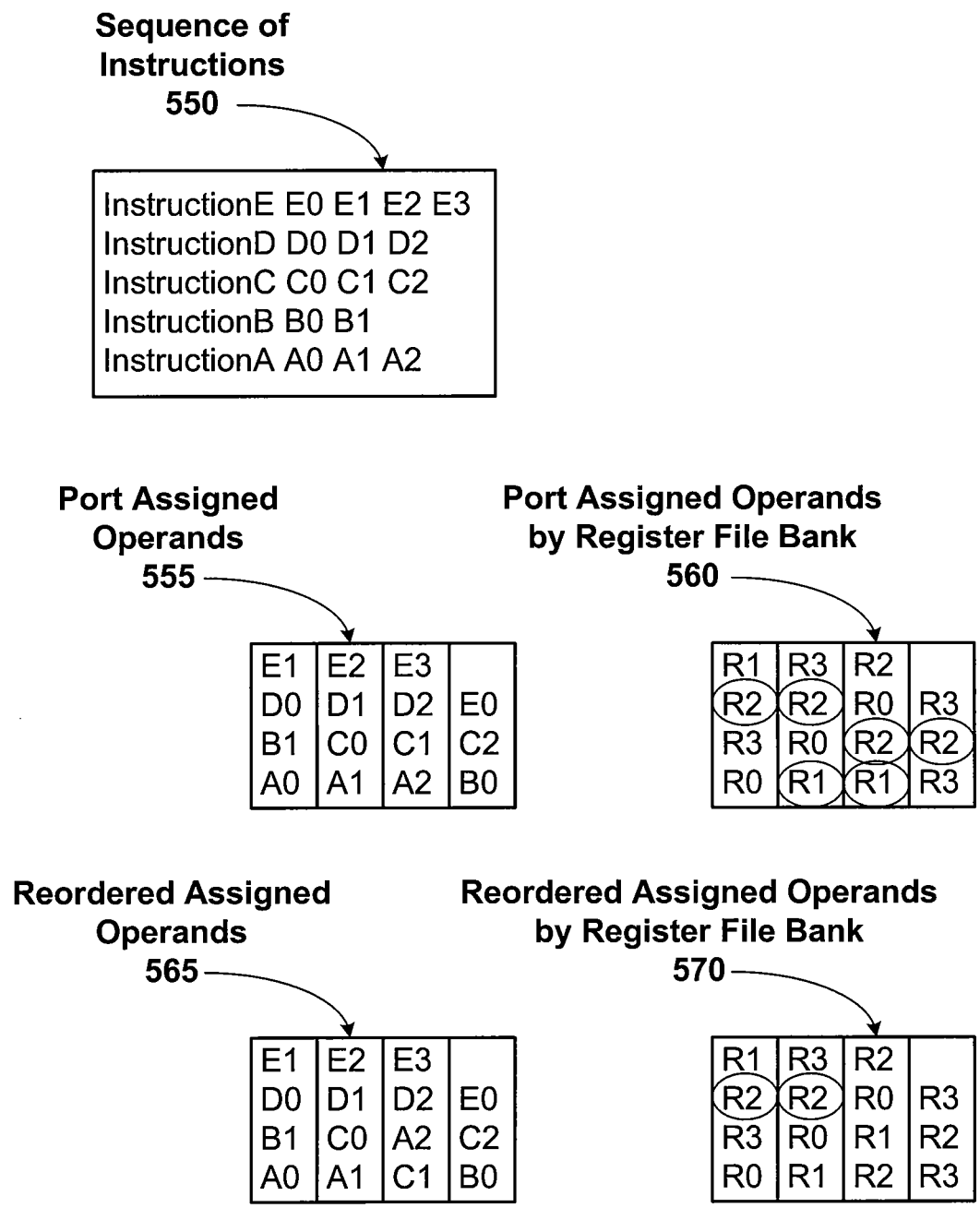
FIG. 5C illustrates an example of assigning operands to ports and reordering the operands within a port for collection, according to one embodiment of the present invention.

FIG. 5C illustrates an example of assigning operands to ports and reordering the operands within a port for collection, according to one embodiment of the present invention. A sequence of instruction 550 includes five instructions that each specify operands. A first instruction, InstructionA specifies operands A0, A1, and A2. A second instruction, InstructionB specifies operands B0 and B1. A third instruction, InstructionC specifies operands C0, C1, and C2. A fourth instruction, InstructionD specifies operands D0, D1, and D2. A fifth instruction, InstructionE specifies operands E0, E1, E2, and E3. As the instructions are received by the instruction queue 505, the operands specified by the instructions are assigned to ports by the port assignment unit 527. The resulting assignments are shown as port assigned operands 555.

In one embodiment the port request buffers 510 are configured to store at least four assigned operands. Operands A0, B1, D0, and E1 are assigned to a first port. Operands A1, C0, D1, and E2 are assigned to a second port. Operands A2, C1, D2, and E3 are assigned to a third port. Operands B0, C2, and E0 are assigned to a fourth port. Importantly, the operands specified by a single instruction are assigned to different ports. Other assignments are possible that also assign each operand specified by a single instruction to a different port. Each one of the operands is stored in a bank of the multi-bank register file 520. The mapping of the operands to the banks is shown as port assigned operands by register file bank 560, where R0, R2, R2, and R3 are four different banks in the multi-bank register file 520.

Bank conflicts in each row are circled in the port assigned operands by register file bank 560. The bank conflicts assume that the operands in each row would be selected for a single read request. Clearly, reordering of the assigned operands within either the second or third port is needed to avoid a bank conflict for bank R1. The collection schedule unit 512 (or 532) reorders the assigned operands to avoid bank conflicts, while giving priority to older assigned operands. The assigned operands in the third port are reordered so that operand A2 is swapped with operand A2, producing the reordered assigned operands 565. This reordering avoids two of the three the bank conflicts that exist in the port assigned operands by register file bank 560. The new bank mapping is shown in reordered assigned operands by register file bank 570. Reordered assigned operands A0, A1, C1, and B0 may be output to read request register 515 to be read in a single clock cycle without any bank conflicts. The assigned operands may be effectively reordered as the operands are transferred from the port request buffers to the read request register 515 under the control of the collection schedule unit 512.

Figure 6A:
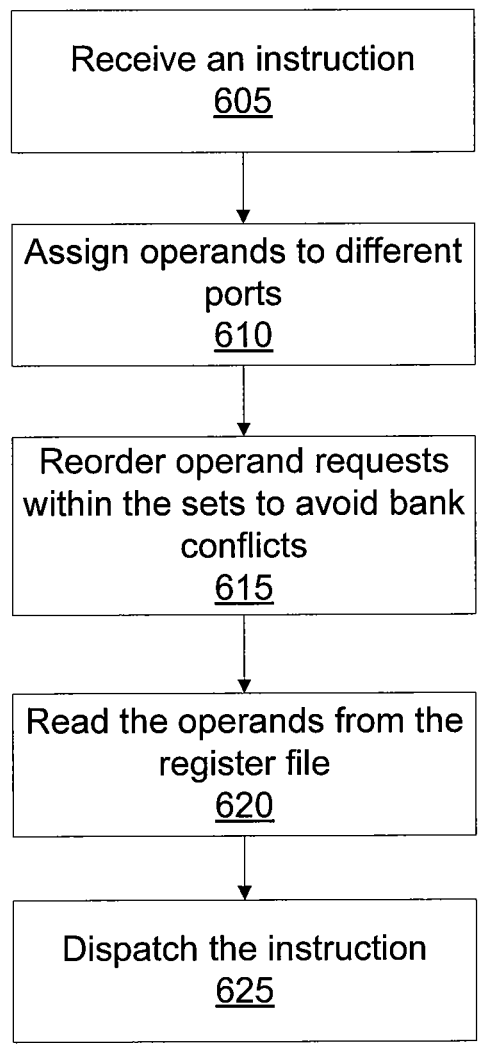
FIG. 6A is a flow diagram of method steps for collecting operands specified by instructions, according to one embodiment of the present invention.

FIG. 6A is a flow diagram 600 of method steps for collecting operands specified by instructions, according to one embodiment of the present invention. At step 605 an instruction that specifies operands is received. At step 610 the specified operands are assigned to different ports by the port assignment unit 527, so that one of the port request buffers 510 stores a different set of assigned operands. At step 615 the collection schedule unit 512 reorders the assigned operands within each set of assigned operands to avoid bank conflicts between different banks of the multi-bank register file 520. At step 620 the operands are read from the multi-bank register file 520 in one or more clock cycle and stored in the destination collector 525. One operand from each set of assigned operands may be read from the multi-bank register file 520 in an access cycle.

At step 625 the instruction and collected operands are dispatched for execution by the execution units 302. The steps shown in flow diagram 600 are performed for a sequence of instructions that are received by the local register file 304. The sequence in which the instructions (and collected operands) are dispatched may be different that the sequence in which the instructions were received by the local register file 304.

Figure 6B:
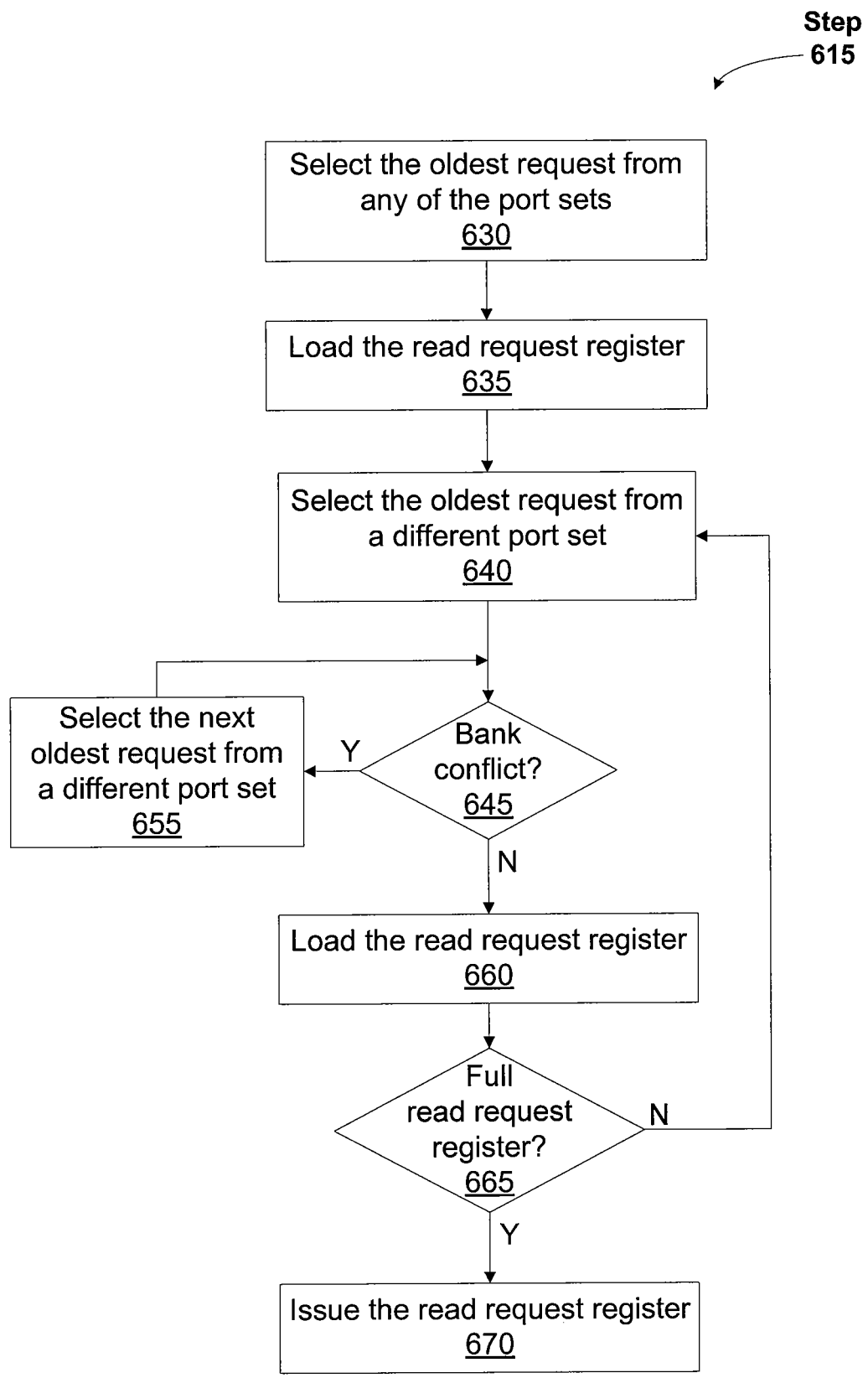
FIG. 6B is a flow diagram of method steps for reordering assigned operands, according to one embodiment of the present invention.

FIG. 6B is a flow diagram of method steps for performing step 615 of FIG. 6A to reorder the assigned operands, according to one embodiment of the present invention. At step 630 the oldest request for an operand in any of the port sets stored in the port request buffers 510 is selected by the collection schedule unit 512. In one embodiment the oldest request for an operand in the port request buffer 510-0 is selected first by the collection schedule unit 512 rather than selecting from any of the port request buffers 510.

At step 635 a first slot in the read request register 515 is loaded with the request for an operand that was selected in step 630. At step 640 the oldest request for an operand in a different one of the port sets stored in the port request buffers 510 is selected by the collection schedule unit 512. At step 645 the collection schedule unit 512 determines if a bank conflict exists between the oldest request selected in step 640 and the request for an operand loaded in the first slot of the read request register 515. If a bank conflict does exist, then at step 655 a next oldest request for an operand in a different one of the port sets (but not the port set that provided the request for an operand loaded into the first slot) is selected. Steps 645 and 655 are repeated until a request for an operand is found that does not present a bank conflict. In one embodiment of the invention, a timeout mechanism may be used to proceed directly to step 670 when an operand cannot be found that does not present a bank conflict.

When, at step 645 the collection schedule unit 512 determines that a bank conflict does not exist between the oldest request selected in step 640 and the request for an operand loaded in the first slot of the read request register 515, another slot in the read request register 515 is loaded with the selected request for an operand. At step 665 the collection schedule unit 512 determines if all of the slots in the read request register 515 are loaded with requests for operands, i.e., if the read request register 515 is full, and, if so, at step 670 the read request register 515 is issued to read the operands from the multi-bank register file 520 via the request crossbar 518. When the read request register 515 is not full at step 665, the collection schedule unit 512 returns to step 640 to fill another slot in the read request register 515.

Although the method steps are described in conjunction with the systems of FIGS. 1, 2, 3A, 3B, 3C, 5A, and 5B, persons skilled in the art will understand that any system configured to perform the method steps, in any order, is within the scope of the inventions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for collecting operands specified by instructions, comprising:
    storing a sequence of instructions that specify operands in a queue;
    assigning each operand specified by an instruction in the queue to a different read request port to produce a set of assigned operands for each one of the read request ports, wherein each read request ports is associated with a read port of a multi-bank register file;
    reordering the assigned operands within each set of assigned operands to avoid bank conflicts between different banks of the multi-bank register file; and
    reading the multi-bank register file to obtain one operand from each set of assigned operands in an access cycle.

2. The method of claim 1, wherein the multi-bank register file comprises four banks and each one of the four banks corresponds to one of four sets of the assigned operands.

3. The method of claim 1, wherein the assigning of each operand is based on age of the corresponding instructions with older instructions given higher priority than younger instructions.

4. The method of claim 1, further comprising dispatching an instruction and the collected operands specified by the instruction for execution.

5. The method of claim 4, further comprising selecting the instruction from multiple instructions based on the instruction being older than other instructions of the multiple instructions.

6. The method of claim 1, wherein the reading of the reading the multi-bank register file further comprises receiving a texture read request and delaying reading of one of the operands to read texture data from the multi-bank register file.

7. The method of claim 1, further comprising dispatching the instructions and collected operands in an order that is different than the sequence of instructions order.

8. The method of claim 1, further comprising:
    determining that the queue is empty;
    receiving a new instruction that specifies new operands; and
    assigning each one of the new operands to a different read request port before the new instruction is stored in the queue.

9. The method of claim 1, further comprising the step of determining that space is available in an assignment buffer to store all of the operands specified by an instruction before assigning any of the operands specified by the instruction.

10. A computer-readable storage medium storing instructions that, when executed by a processor, cause the processor to collect operands specified by instructions, by performing the steps of:
    storing a sequence of instructions in a queue;
    assigning each operand specified by an instruction to a different read request port to produce a set of assigned operands for each one of the read request ports, wherein each read request ports is associated with a read port of a multi-bank register file;
    reordering the assigned operands within each set of assigned operands to avoid bank conflicts between different banks of the multi-bank register file; and
    reading the multi-bank register file to obtain one operand from each set of assigned operands in an access cycle.

11. A system for collecting operands specified by instructions, the system comprising:
    a streaming multi-processor including a local register file that is configured to:
    store a sequence of instructions in a queue;
    assign each operand specified by an instruction to a different read request port to produce a set of assigned operands for each one of the read request ports, wherein each read request ports is associated with a read port of a multi-bank register file;
    reorder the assigned operands within each set of assigned operands to avoid bank conflicts between different banks of the multi-bank register file; and
    read the multi-bank register file to obtain one operand from each set of assigned operands in an access cycle.

12. The system of claim 11, wherein the multi-bank register file comprises four banks and each one of the four banks corresponds to one of four sets of the assigned operands.

13. The system of claim 11, wherein the local register file is further configured to assign each operand based on age of the corresponding instructions, giving older instructions higher priority than younger instructions.

14. The system of claim 11, wherein the local register file is further configured to dispatch an instruction and the collected operands specified by the instruction for execution.

15. The system of claim 14, wherein the local register file is further configured to select the instruction from multiple instructions based on the instruction being older than other instructions of the multiple instructions.

16. The system of claim 11, wherein the local register file is further configured to receive a texture read request and delay reading of one of the operands to read texture data from the multi-bank register file.

17. The system of claim 11, wherein the local register file is further configured to dispatch the instructions and collected operands in an order that is different than the sequence of instructions order.

18. The system of claim 11, wherein the local register file is further configured to:
    determine that the queue is empty;
    receive a new instruction that specifies new operands; and
    assign each one of the new operands to a different read request port before the new instruction is stored in the queue.

19. The system of claim 11, wherein the local register file is further configured to determine that space is available in an assignment buffer to store all of the operands specified by an instruction before assigning any of the operands specified by the instruction.

* * * * *